(12) United States Patent
Varesio

(10) Patent No.: US 7,965,660 B2
(45) Date of Patent: Jun. 21, 2011

(54) CONFERENCE WHERE MIXING IS TIME CONTROLLED BY A RENDERING DEVICE

(75) Inventor: Andrea Varesio, Turin (IT)

(73) Assignee: Telecom Italia S.p.A., Milan (IT)

( * ) Notice: Subject to any disclaimer, the term of this patent is extended or adjusted under 35 U.S.C. 154(b) by 92 days.

(21) Appl. No.: 12/448,644

(22) PCT Filed: Dec. 29, 2006

(86) PCT No.: PCT/EP2006/012598
§ 371 (c)(1),
(2), (4) Date: Sep. 18, 2009

(87) PCT Pub. No.: WO2008/080426
PCT Pub. Date: Jul. 10, 2008

(65) Prior Publication Data
US 2010/0039962 A1 Feb. 18, 2010

(51) Int. Cl.
*H04L 12/16* (2006.01)
(52) U.S. Cl. .................. 370/260; 370/389; 370/353
(58) Field of Classification Search .................. 370/353, 370/389; 709/217, 232
See application file for complete search history.

(56) References Cited

U.S. PATENT DOCUMENTS

| | | | |
|---|---|---|---|
| 5,390,177 A | 2/1995 | Nahumi | |
| 5,666,407 A | 9/1997 | Pfeifer | |
| 6,594,773 B1 * | 7/2003 | Lisitsa et al. | 713/600 |
| 7,382,773 B2 * | 6/2008 | Schoeneberger et al. | 370/353 |
| 7,688,820 B2 * | 3/2010 | Forte et al. | 370/389 |
| 2002/0110248 A1 * | 8/2002 | Kovales et al. | 381/56 |
| 2003/0142662 A1 | 7/2003 | Mahajan | |
| 2005/0034079 A1 * | 2/2005 | Gunasekar et al. | 715/753 |
| 2006/0031607 A1 * | 2/2006 | Berreth | 710/52 |
| 2006/0149495 A1 * | 7/2006 | Mazalek et al. | 702/150 |
| 2006/0173972 A1 * | 8/2006 | Jung et al. | 709/217 |
| 2007/0005795 A1 * | 1/2007 | Gonzalez | 709/232 |

FOREIGN PATENT DOCUMENTS

| | | |
|---|---|---|
| EP | 0 617 537 B1 | 9/1994 |
| EP | 0 778 714 A2 | 6/1997 |
| EP | 0 855 827 B1 | 7/1998 |
| JP | 5-37655 | 2/1993 |

* cited by examiner

*Primary Examiner* — Thong Vu
(74) *Attorney, Agent, or Firm* — Finnegan, Henderson, Farabow, Garrett & Dunner, L.L.P.

(57) ABSTRACT

A telecommunications terminal hosts a conference mixer adapted to enable an at least audio conference between a first conference peer and at least two further conference peers. The conference mixer includes for each of the at least two further conference peers, a respective first data buffer configured to buffer portions of at least an audio data stream received from the respective conference peer; a first audio data stream portions mixer fed by the first data buffers and configured to: a) get audio data stream portions buffered in the first data buffers; b) mix the audio data stream portions from the first data buffers to produce a first mixed audio data portion; and c) feed the first mixed audio data portion to a rendering device of the telecommunications terminal, wherein the first audio data stream portions mixer is configured to perform operations a), b) and c) upon receipt of a notification from the rendering device indicating that the rendering device is ready to render a new mixed audio data portion.

25 Claims, 6 Drawing Sheets

CONFERENCE WHERE MIXING IS TIME CONTROLLED BY A RENDERING DEVICE

CROSS REFERENCE TO RELATED APPLICATION

This application is a national phase application based on PCT/EP2006/012598, filed Dec. 29, 2006.

BACKGROUND OF THE INVENTION

1. Field of the Invention

The present invention generally relates to the field of telecommunications, and particularly to audio or audio/video conferencing. Specifically, the invention concerns a telecommunications terminal hosting an audio, or an audio/video conference mixer.

2. Description of the Related Art

In the field of telecommunications, the diffusion of Voice over Internet Protocol (VoIP) services, and of devices supporting them, is growing rapidly. A similar rapid growth is experienced by video communication (VDC) services and supporting devices.

Most often, services of this kind involve two intercommunicating peers, but an interesting extension is represented by "virtual" audio and/or video conferencing, where more than two parties ("peers") are involved in the audio and/or video communication session, and can interact with each other by listening/speaking and/or viewing.

Apparatuses that enable virtual audio and/or video conferences are known as "conference mixers". Essentially, a conference mixer gathers the audio and/or video contents generated by local capturing devices (microphones, videocameras) provided in user terminals (the "endpoints") at each of the conferencing parties, properly mixes the gathered audio and/or video contents, and redistributes the mixed contents to every party to the virtual conference.

Conventionally, conference mixers are apparatuses distinct and remote from the endpoints of the conferencing parties, being core network apparatuses (referred to as "Master Control Units", shortly MCUs).

Solutions for incorporating conference mixing functions in the endpoints of the conference peers are known in the art.

For example, in the published patent application US 2003/0142662 a packet data terminal is disclosed, particularly a personal computer, personal digital assistant, telephone, mobile radiotelephone, network access device, Internet peripheral and the like, which initiates, coordinates and controls the provision of on-demand conference call services, with little or no network support. A digital-to-analog converter for converting first and second packet data stream into separate analog representation; a selective mixer manipulates the analog representations to provide a mixed output; a multiplexer circuit distributes the packet data stream to a plurality of call sessions.

SUMMARY OF THE INVENTION

The Applicant from one hand observes that the implementation of virtual audio or audio/video conference services based on the provision of dedicated core network equipments (the MCUs) is not satisfactory, mainly because it impacts the telephone/telecommunications network structure, and involves costs for the network operators. Thus, the Applicant believes that a different implementation of virtual conference services, in which an audio or audio/video conference mixing functionality is hosted at the endpoint of at least one of the peers engaged in the virtual audio or audio/video conference is better, because it has essentially no impact on the telephone/telecommunications network.

Nevertheless, the Applicant has observed that an important aspect that remains to be carefully considered is the reduction, as far as possible, of the end-to-end delay which is experienced by the peers engaged in a virtual conference.

The Applicant has tackled the problem of how to reduce the end-to-end delay in virtual audio or audio/video conference services to be enjoyed through a conference mixer hosted in an endpoint of one of the conference peers.

The Applicant has found that the end-to-end delay experienced in virtual audio or audio/video conferences can be reduced, provided that the mixing operations are timed by the rendering device(s) and/or the capturing device(s) of the endpoint hosting the conference mixer.

According to an aspect of the present invention, a telecommunications terminal is provided, hosting a conference mixer adapted to enabling an at least audio conference between a first conference peer and at least two further conference peers. The conference mixer comprises:

for each of the at least two further conference peers, a respective first data buffer configured to buffering portions of at least an audio data stream received from the respective conference peer;

a first audio data stream portions mixer fed by the first data buffers and configured to:
 a) get audio data stream portions buffered in the first data buffers;
 b) mix the audio data stream portions got from the first data buffers to produce a first mixed audio data portion; and
 c) feed the first mixed audio data portion to a rendering device of the telecommunications terminal, wherein said first audio data stream portions mixer is configured to perform operations a), b) and c) upon receipt of a notification from said rendering device indicating that the rendering device is ready to render a new mixed audio data portion.

For the purposes of the present invention, by "audio conference" there is meant a virtual conference between three or more peers, including at least audio. Possibly, the audio conference could also include video, i.e. it could be an audio/video virtual conference.

According to another aspect of the present invention, a method of performing an at least audio conference between a first conference peer and at least two further conference peers, the method comprising:

at a telecommunications terminal of the first conference peer, performing a first buffering of portions of at least an audio data stream received from each of the at least two further conference peer; and upon receipt of a notification from a rendering device of the telecommunications terminal, indicating that the rendering device is ready to render a new mixed audio data portion:

mixing the audio data stream portions buffered in said first buffering, to produce the mixed audio data portion; and feeding the mixed audio data portion to the rendering device.

BRIEF DESCRIPTION OF THE DRAWINGS

The features and advantages of the present invention will be best understood reading the following detailed description of an exemplary embodiment thereof, provided merely by way of non-limitative example, description that will be conducted making reference to the annexed drawings, wherein.

DETAILED DESCRIPTION OF AN EMBODIMENT OF THE INVENTION

Figure 1:
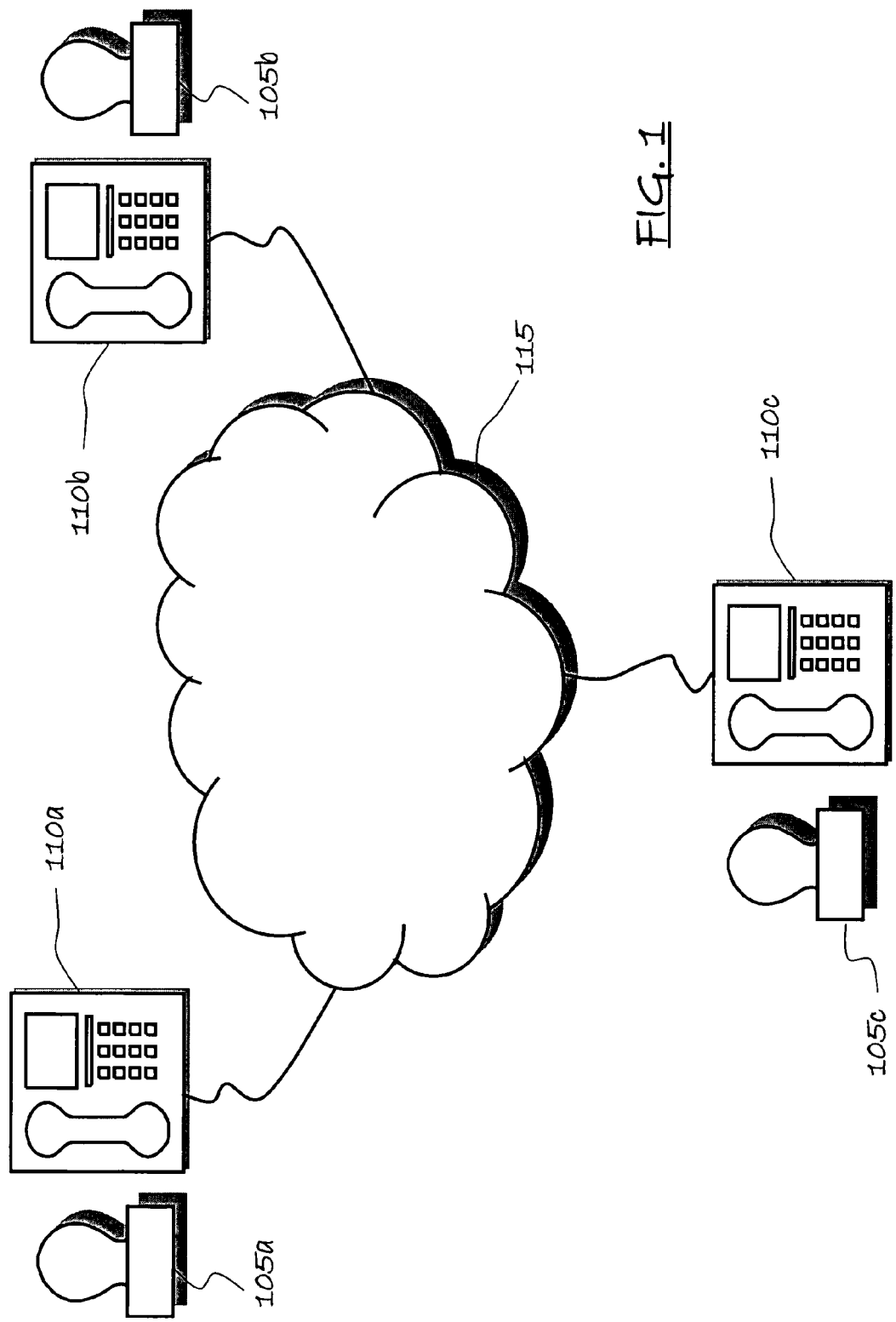
FIG. 1 schematically shows a scenario where the present invention is applied.

Referring to the drawings, in FIG. 1 a scenario where the present invention is applicable is schematically shown. Reference numerals 105a, 105b and 105c denote three persons engaged in an virtual audio conference, exploiting respective communication terminals 110a, 110b and 110c, like for example video-telephones, Personal Digital Assistants (PDAs), mobile phones, personal computers, interconnected through a telecommunication network 115 that may include a wireline and/or wireless telephone network, and a packet data network like the Internet.

The three persons (peers) 105a, 105b and 105c involved in the virtual audio conference can each talk to, and be seen by the other two peers, and each of the three peers can listen to and see the other two peers. This is made possible by a conference mixer, the main functionality of which is to provide "virtual conferencing" user experience.

It is pointed out that the choice of considering just three conferencing peers is merely dictated by reasons of description simplicity: the present invention is not so limited, and is applicable to any number of conferencing peers.

Figure 2:
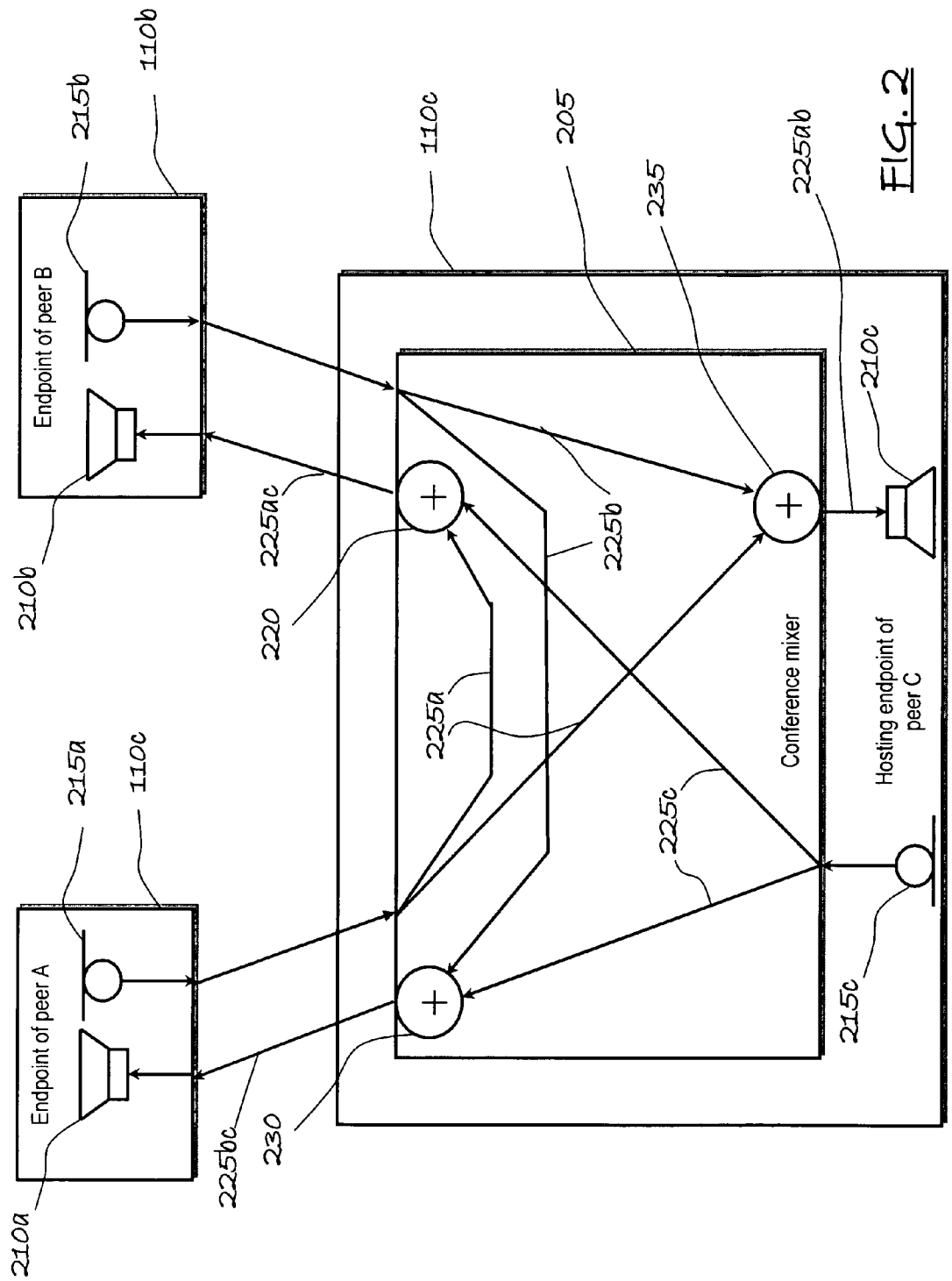
FIG. 2 schematically shows, in terms of functional blocks, the structure of an audio conference mixer according to an embodiment of the present invention.

Referring to FIG. 2, the main components of an audio conference mixer according to an embodiment of the present invention are schematically shown.

The conference mixer, denoted 205, is hosted by one of the terminals (endpoints) of the three peers engaged in the virtual audio conference, in the shown example at the endpoint 110c of the peer 105c (the "peer C"). It is sufficient that the endpoint of at least one of the peers involved in the virtual conference hosts the conference mixer (in general, the conference mixer may be hosted by the endpoint of the peer that initiates the virtual conference), however nothing prevents that a conference mixer is also hosted by one or more of the endpoints of the other peers.

The conference mixer 205 comprises a first mixer 220 configured to receive audio data streams 225a and 225c, respectively received from the endpoint 110a of the peer 105a (the "peer A") and generated by the endpoint 110c of the peer C, and to generate a mixed audio data stream 225ac to be sent to the endpoint 110b of the peer 105b (the "peer B"). The audio data streams 225a and 225c are generated by capturing devices like microphones 215a and 215c of the endpoints 110a and 110c; at the endpoint 110b, the mixed audio data stream 225ac is rendered by a rendering device like a loudspeaker 210b.

The conference mixer further comprises a second mixer 230, configured to receive the audio data stream 225c, generated by the endpoint 110c of the peer C, and an audio data stream 225b received from the endpoint 110b of the peer B, and to generate a mixed audio data stream 225bc to be sent to the endpoint 110a of the peer A. The audio data stream 225b is generated by a microphone 215b of the endpoints 110b; at the endpoint 110a, the mixed audio data stream 225bc is rendered by a loudspeaker 210a.

The conference mixer further comprises a third mixer 235, configured to receive the audio data stream 225a, received from the endpoint 110a of the peer A, and the audio data stream 225b, received from the endpoint 110b of the peer B, and to generate a mixed audio data stream 225ab, rendered by a loudspeaker 210c of the endpoint 110c.

In particular, the audio data streams are in digital format, and the mixers are digital mixers.

It is pointed out that the number of data stream mixers of the conference mixer 205, as well as the number of data streams that each of the mixers is configured to receive and mix, depend on the number of peers engaged in the virtual conference.

It is also worth pointing out that the operation performed by the conference mixer 205 differs from the operation performed by a MCU provided in the core network. The conference mixer 205 integrates the operations of grabbing, rendering and mixing in a single device (the device 110c), while a MCU in the core network performs all the operation relevant to a rendering device in order to have access to the audio samples to be mixed, mixes them and transmits (possibly compressing) to the appropriate peer.

Figure 3:
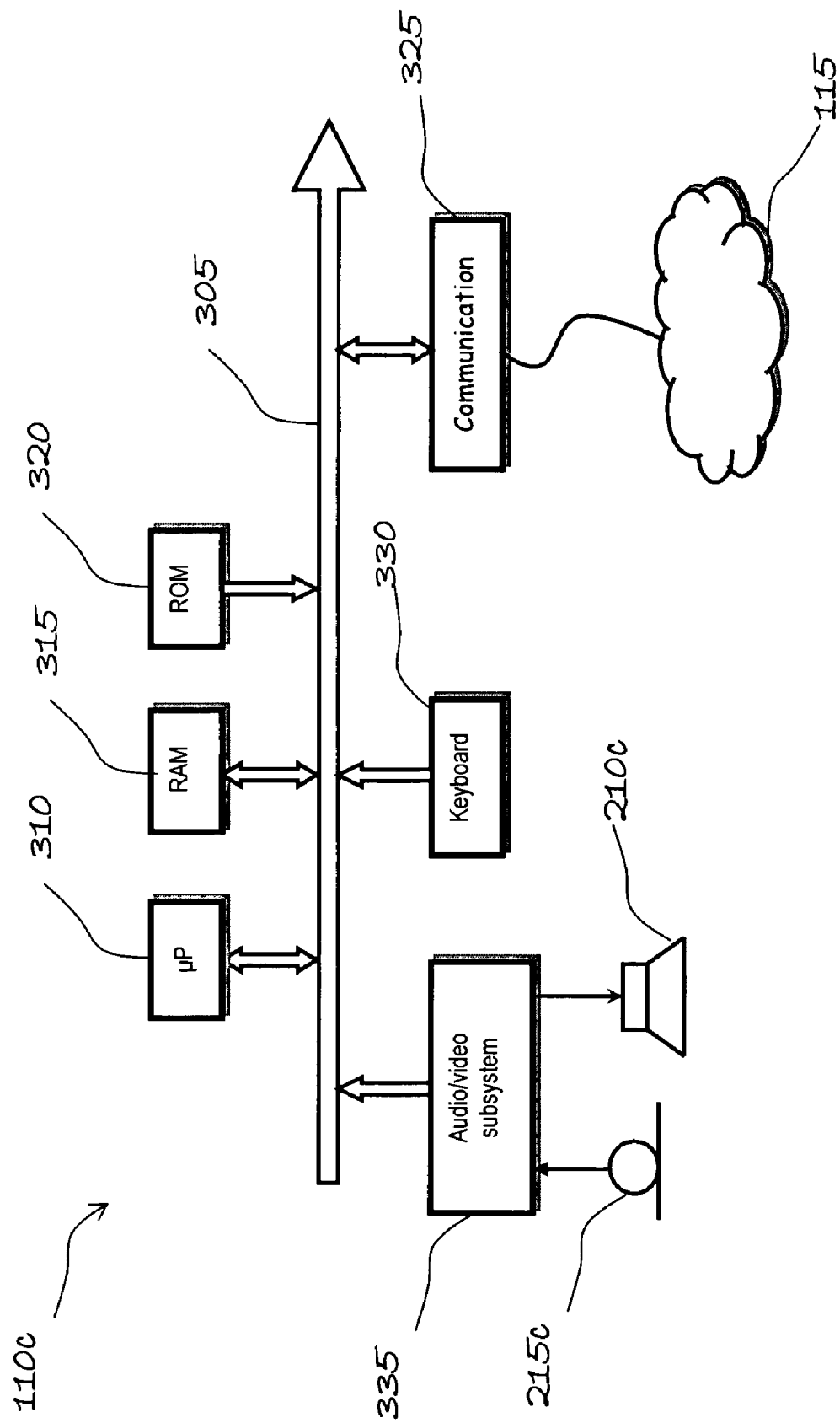
FIG. 3 schematically shows the main functional components of a communication terminal adapted to host the audio conference mixer of FIG. 2.

Referring to FIG. 3, there is schematically depicted the hardware structure of the endpoint 110c that hosts the conference mixer 205. Essentially, it is the general structure of a data processing apparatus, with several units that are connected in parallel to an internal data communication bus 305. In detail, a data processor (microprocessor or microcontroller) 310 controls the operation of the terminal 110c; a RAM (Random Access Memory) 315 is directly used as a working memory by the data processor 310, and a ROM (Read Only Memory) 320 stores the microcode (firmware) to be executed by the data processor 310. A communication subsystem 325 includes hardware devices for handling at least the physical level of the communications over the telephone/telecommunications network 115; a keyboard 330 is provided for dialing the telephone numbers; an audio/video subsystem 335 manages the loudspeaker/display device 210c and the microphone/videocamera 215c.

Figure 4:
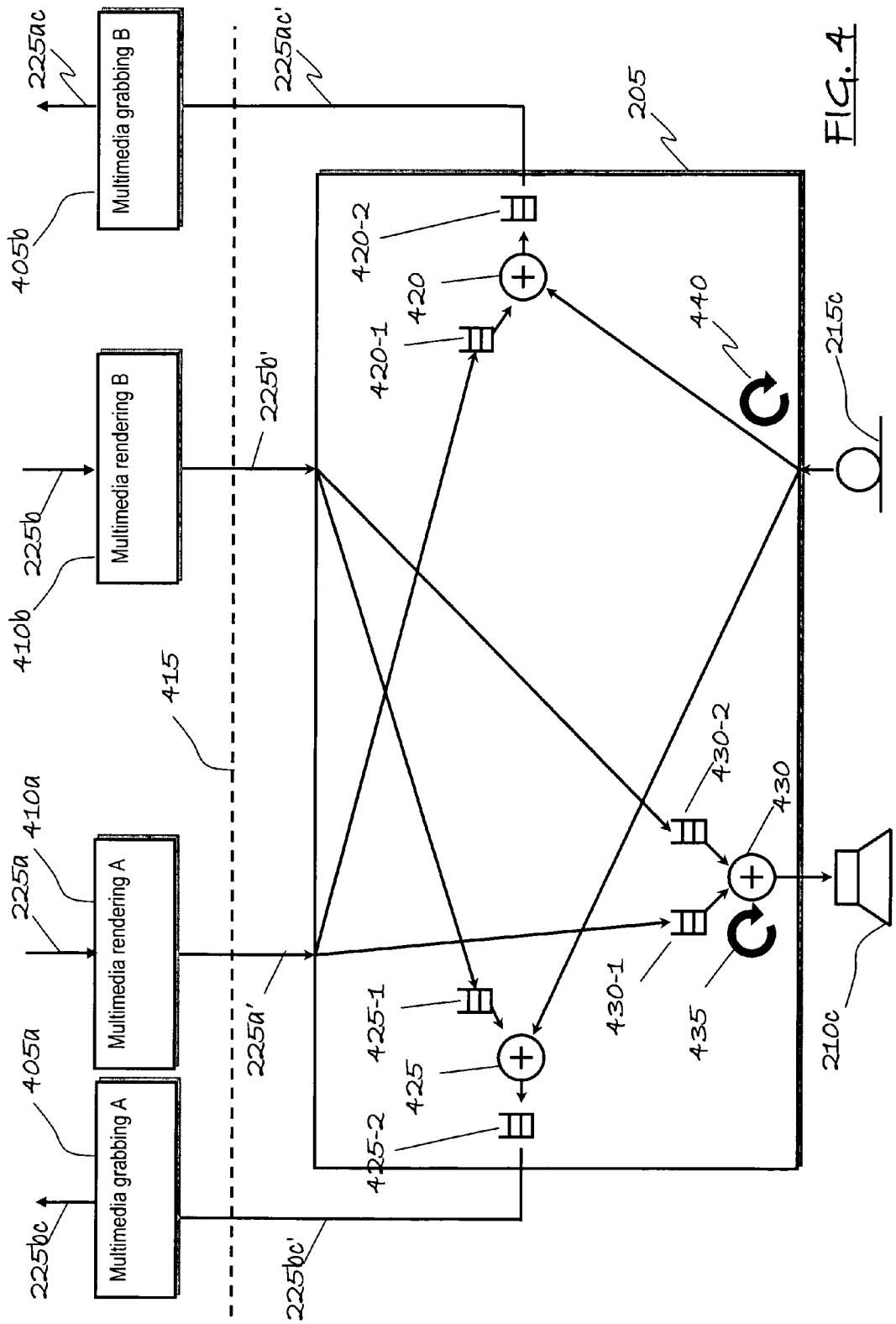
FIG. 4 shows in greater detail the structure of the audio conference mixer according to an embodiment of the present invention.

Passing to FIG. 4, the functional components of the conference mixer 205 are shown in greater detail. In particular, FIG. 4 shows the partial content of the working memory 315 of the terminal 110c during a virtual conference between the peers A, B and C; thus, the functional blocks depicted in FIG. 4 are to be intended as software/firmware modules, or instances of software/firmware modules. This is however not to be construed as a limitation of the present invention, which might be implemented totally in hardware, or as a combination of hardware and software/firmware.

Blocks 405a and 405b represent instances of a grabbing multimedia software module, adapted to perform the tasks of grabbing the mixed audio data streams 225bc' and, respectively, 225*ac'*, code them to obtain coded (i.e. compressed) data streams 225*bc* and, respectively, 225*ac*, and of transmitting them over the telephone/telecommunications network 115 to the endpoints 110*a* and, respectively, 110*b* of the peers A and B.

In a preferred embodiment of the present invention, the mixing operation of the audio data streams that generates the mixed audio data streams 225*bc* and 225*ac* is performed in the uncompressed domain (on Pulse Code Modulated values); this avoids the problem of compatibility between different compression algorithms (for example G.723, AMR, G.722) that may have been negotiated between the different peers (in other words, peers A and C might have negotiated a compression algorithm different from that negotiated between the peers B and C). In this case, the grabbing multimedia software module instances 405*a* and 405*b* are also responsible of the encoding the mixed audio data streams 225*bc* and 225*ac* in a respective, predetermined coding standard, that may be different for the different peers A and B of the virtual conference.

Blocks 410*a* and 410*b* represent instances of a rendering multimedia software module adapted to perform the tasks (independent from the grabbing tasks performed by blocks 405*a* and 405*b*) of receiving the audio data streams 225*a* and 225*b*, respectively, transmitted by the endpoints 110*a* and, respectively, 110*b* over the telephone/telecommunications network 115, decode the received audio data streams 225*a* and 225*b* to obtain decoded data streams 225*a'* and 225*b'*, and render them through the loudspeaker 210*c* of the endpoint 110*c*.

The grabbing and rendering multimedia software module instances 405*a*, 405*b*, 410*a* and 410*b* are user-space applications, running at the application layer level in the endpoint 110*c*. As known to those skilled in the art, the working memory of a data processor (like the RAM 315 of the terminal 110*c*) can ideally be divided into two basic memory spaces: a "user space" and a "kernel space". The user space is the memory region where the user software/firmware applications or executables reside and run. The kernel space is the memory region where the kernel software/firmware modules or executables reside; kernel software/firmware modules are software/firmware modules forming the core of an operating system which is started at the bootstrap of the data processor, and whose function is to provide an environment in which other programs can run, provide hardware services to them (like supplying memory and access to space on storage devices), schedule their execution and allow multiple processes to coexist.

Generally, in order to access audio capturing and playing (grabbing and rendering) resources (the microphone 215*c*, the loudspeaker, 210*c*), the grabbing and rendering multimedia software module instances 405*a*, 405*b*, 410*a* and 410*b* exploit dedicated library modules, typically user-space library modules.

As known to those skilled in the art, there are two possible approaches in accessing and using devices like microphones and loudspeakers: using library modules running in user space, or directly using kernel-space device drivers Application Program Interfaces (APIs). Library modules use device driver APIs to control the device of interest. Kernel-space device drivers are used when the operating system prevents user-space applications to access directly the hardware resources; normally this is related to the presence of hierarchical protection domains (or protection rings) in the operating system, acting as a protection method from application-generated faults. Device drivers can run in user space (and thus act as a user-space library modules) when the operating system does not implement protection rings concepts.

In an embodiment of the present invention, the conference mixer 205 is implemented as a user-space process or thread, preferably of high priority, running in the endpoint 110*c*; in this case, the conference mixer 205 can replace the library modules used by the instances 405*a*, 405*b*, 410*a* and 410*b* of the user-space grabbing and rendering multimedia modules (application layer) to access the capturing and rendering audio resources 210*c* and 215*c*.

Alternatively, the conference mixer 205 might be implemented as a kernel-space device driver. In this case, the conference mixer 205 replaces the kernel device driver normally responsible of handling the audio grabbing and rendering operations.

Implementing the conference mixer functionality as a kernel-space device driver allows better exploiting the low latency benefit of treating data within an interrupt service routine, and avoiding charging the system with high priority user space threads/processes.

In FIG. 4, line 415 indicates an API exposed by the conference mixer 205, through which it can be accessed by the grabbing and rendering multimedia software module instances 405*a*, 405*b*, 410*a* and 410*b*. The API 415 replicates the same functionalities provided by the library modules used to access the I/O resources 210*c* and 215*c*. The behavior of the multimedia rendering and grabbing module instances 405*a*, 405*b*, 410*a* and 410*b* does not need to be changed in order to allow them interact with the conference mixer 205 (whose presence is thus transparent to the multimedia rendering and grabbing module instances 405*a*, 405*b*, 410*a* and 410*b*).

The conference mixer 205 comprises (in the example herein considered of virtual conference involving three peers) three audio data stream chunk mixers 420, 425 and 430, adapted to mix portions (or chunks) of the audio data streams. Two data buffers 420-1 and 420-2, 425-1 and 425-2, and 430-1 and 430-2 are operatively associated with each of the mixers 420, 425 and 430. Data buffers 420-1 and 425-1 are the data contribution buffers provided in respect of the audio data streams coming from the peers A and, respectively, B, for grabbing purposes. Data buffers 420-2 and 425-2 are the data recipient buffers for the mixed audio data streams to be sent to the peers B and, respectively, A. Data buffers 430-1 and 430-2 are the mixer contribution buffers for the audio data streams received from the peers A and B, respectively, for rendering purposes.

In particular, the mixers 420, 425 and 430 are digital mixers.

In case more than three peers are engaged in the virtual conference, the number of mixers and associated buffers increases; in particular, for each additional peer participating to the virtual conference, a mixer like the mixer 420, with an associated pair of buffers like the buffers 420-1 and 420-2 needs to be added; also, a buffer like the buffer 430-1 or 430-2 has to be added for each additional peer.

Reference numeral 435 denotes an audio rendering procedure, for sending audio data streams chunks ready to be rendered to the loudspeaker 210*c*, for rendering them. Reference numeral 440 denotes an audio capturing procedure, for receiving audio data captured by the microphone 215*c*.

In case the conference mixer 205 is implemented as a user-space process, the mixing operations performed by the mixers 420, 425 and 430 may be implemented as high priority threads/processes. For high priority processes it is intended threads/processes running at a priority higher than the normal tasks. For the purposes of the present invention, high priority is intended to mean the highest possible priority (closest to real-time priority), that does not jeopardize the system stability. Alternatively, if the conference mixer 205 is a kernel-space device driver, the mixing operations performed by the mixers 420, 425 and 430 may be implemented as interrupt service routines, that are started as soon as an interrupt is received from the rendering and capturing devices.

In particular, the mixing operations are performed at the Input/Output (I/O) rate (i.e., at the rate at which data are captured by the capturing devices 215c, and at the rate data to be rendered are consumed by the rendering devices 210c).

In detail, every time a new chunk of audio data is available from the input interface of the microphone 215c, an input mixing operation is performed by the mixers 420 and 425: the next available chunk of data present in the data contribution buffer 420-1 and 425-1, respectively, is taken, and it is mixed with the new audio data chunk just captured by the microphone 215c.

Similarly, every time a new chunk of audio data is requested by the loudspeaker 210c output interface, an output mixing operation is performed by the mixer 430, using the next available chunk of audio data present in the mixer contribution buffers 430-1 and 430-2.

This guarantees the minimum end-to-end delay between the availability of data (from the microphone 215c, or from the rendering multimedia software module instances 410a and 410b) and the production of data (for the grabbing multimedia software module instances 405a and 405b and the loudspeaker 205c).

Figure 5:
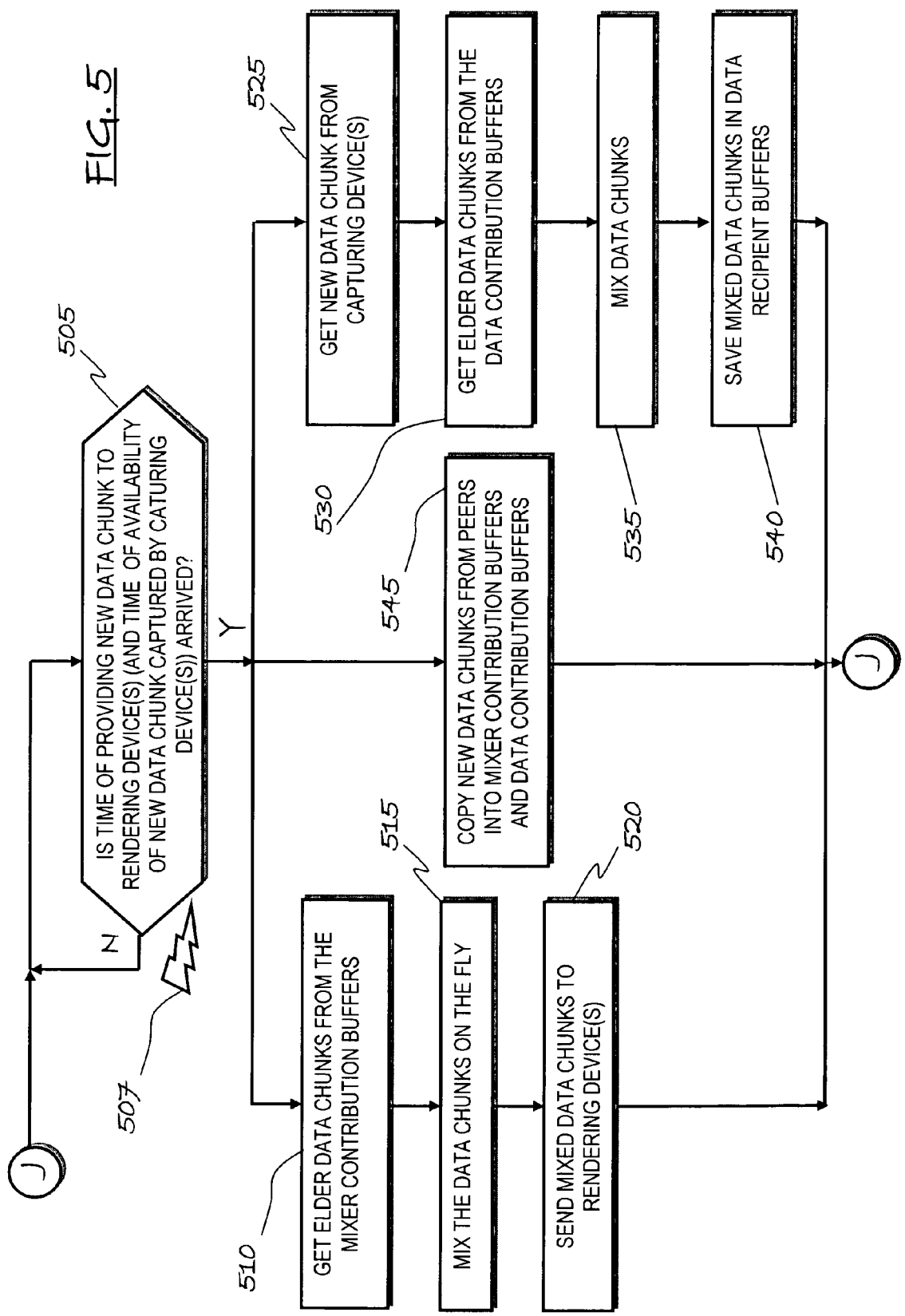
FIG. 5 depicts, in terms of a schematic flowchart, the operation of the audio conference mixer of FIG. 4, in an embodiment of the present invention.

The operation of the conference mixer 205 is explained in detail herein below, referring to the flowchart of FIG. 5. In the following explanation, it is assumed that the rendering devices 210c and the capturing devices 215c operate on a same time base, i.e. with a same clock, so that they (their I/O interfaces) generate simultaneous interrupts (i.e., they are synchronous); however, this is not to be construed as a limitation for the present invention, which applies as well in the case the rendering devices 210c and the capturing devices 215c operate with nominally equal but different clocks (the different clocks can drift), and also in case the two clocks are not even nominally equal (in these cases, the interrupts generated by the (input interfaces of the) rendering and capturing devices are not, as a rule, simultaneous.

When the render time of a new audio data chunk arrives (block 505, exit branch Y), the elder data chunks present in the mixer contribution buffers 430-1 and 430-2 are taken (block 510), they are mixed together on the fly (block 515) and the mixed data are fed to the loudspeaker 210c for rendering (block 520). The arrival of the render time of the new audio data chunk is an event 507 that may be signaled by a notification, like an interrupt from the (input interface of the) loudspeaker 210c, if the conference mixer 205 is implemented as a kernel-space device driver, or said notification may be an asynchronous notification from the loudspeaker driver, in case the conference mixer 205 is implemented as a user-space process.

Under the above assumption that the rendering and capturing devices operate based on the same clock, the arrival of the render time of a new data chunk coincides with the arrival of the grabbing time of a new audio data chunk; however, in general, when the grabbing time of a new audio data chunk arrives (also in this case, this event can be an interrupt, if the conference mixer is implemented as a kernel-space device driver, or it can be an asynchronous notification from the microphone driver), the freshly captured audio data chunk is taken (block 525), the elder data chunks present in the data contribution buffers 420-1 and, respectively, 425-1 are taken (block 530), and they are mixed, by the mixers 420 and 425, with the freshly captured data chunk (block 535), to produce a new chunk of mixed audio to be sent to the peers, and the mixed data are put in the data recipient buffers 420-1 and 425-2, respectively (block 540). The grabbing multimedia software module instances 405a and 405b then fetch the elder mixed audio data chunks from the respective data recipient buffer 425-2 and 420-2.

The arrival of the render time of the new audio data chunk is also used to trigger the load of the mixer contribution buffers 430-1 and 430-2 with a new audio frame (i.e., a part, a fragment of the audio data stream) made available by the rendering multimedia software module instances 410a and 410b (block 545), which accesses the conference mixer 205 through the rendering API it exposes; in this description, the term trigger means signaling to the multimedia rendering software module instances 410a and 410b that free space is available in the associated buffer 430-0.1 and 430-2. The multimedia rendering software module instances can then (when data are available) write a new audio frame into the buffers 430-1 and 430-2; the same audio frame is also copied into the respective data contribution buffer 420-1 or 425-1.

Concerning the size of the buffers 420-1 and 420-2, 425-1 and 425-2, and 430-1 and 430-2, a trade-off exists. In order to keep the end-to-end delay low, the buffers should be kept as small as possible. However, this contrasts the requirement of having buffers as big as possible, in order to avoid introducing glitches in the audio streams, due to underflow in one of the data contribution buffers 420-1 and 425-1 (for example, this happens when the data contribution buffer 420-1 is empty when a new captured audio data chunk arrives from the microphone 215c).

Concerning the size of the audio data chunks to be stored in the buffers, significant parameters for determining it are the number of bits per audio sample (for example, 16 bits), the sampling rate (for example, 8 kHz for narrow band compression algorithms like G.723, or 16 kHz for wide band compression algorithms like G.722.2), the duration of the audio frame, i.e. the minimum amount of data handled by the chosen compression algorithm (for example, 10 ms for G.729, 30 ms for G.723, 20 ms for G722). Thus, the data chunk size can be:

$$\text{data chunk size}=\text{samplerate}*\text{bitpersample}/8*\text{durationofaudioframe}.$$

When the endpoints 110a and 110b of the peers A and B use different data compression algorithms, the size of the audio frames coming from the two peers (and made available by the rendering multimedia software module instances) may be different. This introduces additional cases of underflow during the mixing operation: if the amount of data available from all the different contributors of the mixing operation is not enough to produce a complete data chunk in output, a glitch is introduced.

According to an embodiment of the present invention, the conference mixer 205 may compute a single data chunk size, that is used for all the buffers, using the lowest common multiple of all the audio frame sizes used by the different conference peers. For example, assuming that peer A transmits (and receives) audio frames of 30 ms, and peer B transmits (and receives) audio frames of 20 ms, the size of the audio data chunk used by the conference mixer (i.e., the "quantum" of audio data processed by the conference mixer 205) may be 60 ms; this means that every 60 ms, an interrupt arrives from the loudspeaker 210c, and a new data chunk of 60 ms is generated on-the-fly by the mixer 430 and sent to the loudspeaker 210c (similarly, under the assumption that a single time base exists, every 60 ms a new data chunk of audio captured by the microphone 215c is ready).

The number of data chunks that the generic buffer of the conference mixer 205 is designed to store is tuned taking into consideration the interrupt latency time or the task switch latency time provided by the equipment/operating system hosting the multimedia modules. Under the assumption that the latency time is lower than the duration (i.e. the size) of a data chunk, the number of data chunks can be kept to the minimum (each buffer has two registers, each of the size of one data chunk, that are used in a "ping-pong" access mode, alternatively for reading and writing). In other words, when the system is able to process a single data chunk within its duration, an approach wherein each buffer can store two data chunks is regarded as a preferred method for handling data in order to minimize the end-to-end delay: while the processing of a new data chunk is in progress, the system can feed the old data chunk to (from) the rendering (capturing) device. This concept is described better in the description relevant to FIG. 6.

Figure 6:
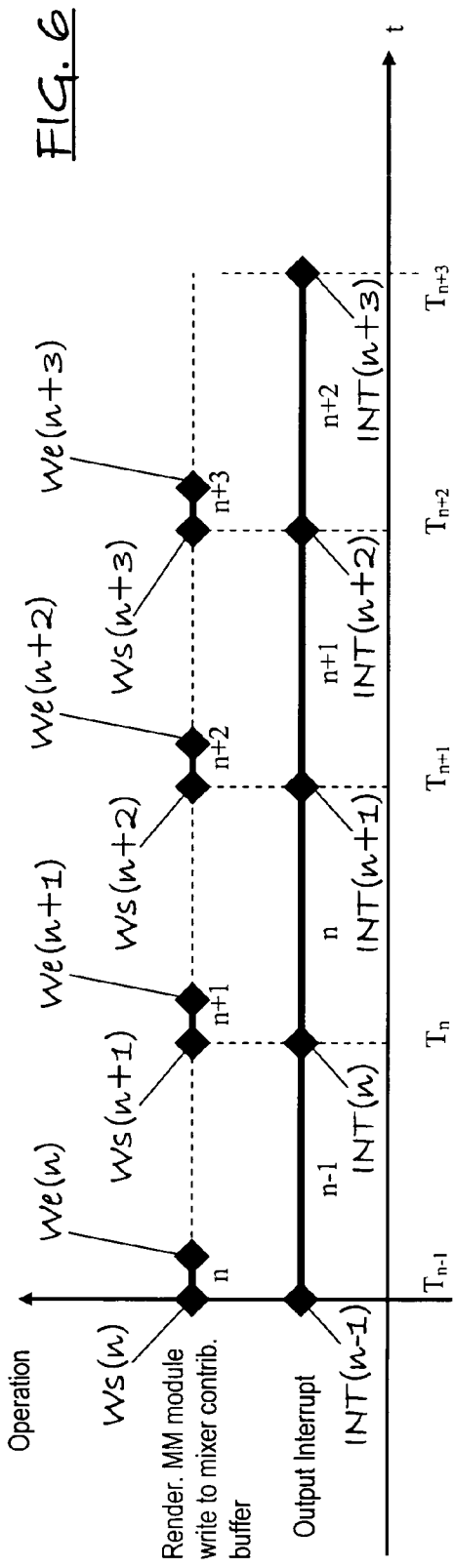
FIG. 6 is a time diagram illustrating the timing of a process of replenishment of an audio data stream fragment buffer of the audio conference mixer of FIG. 2, in an embodiment of the present invention.

The minimum end-to-end delay introduced by the conference mixer 205 is equal to the duration of one audio data chunk between the peers A and C and between the peers B and C (as described in FIG. 6). The additional end-to-end delay introduced by the mixer is equal to the waiting time that a data chunk has to wait in the buffer 430-1 or 430-2 before rendering. In order to avoid underflow in one of the aforementioned buffer, a minimum waiting time of one data chunk time is needed. No additional end-to-end delay is instead introduced in the grabbing path from peer C to peer A or B. The buffers that introduce end-to-end delay are the buffers 420-1, 425-1, 430-1 and 430-2.

Referring to FIG. 6, there is schematically depicted the delay introduced by the mixer contribution buffers 430-1 and 430-2. The minimum level of buffering possible, without introducing artifacts during the mixing operation due to underflow in one of the mixer contribution buffers 430-1 and 430-2, is equal to one data chunk; thus, the end-to-end delay is equal to one data chunk. In the drawing, INT(n−1), INT(n), INT(n+1), INT(n+2), INT(n+3) denote five consecutive interrupts from the rendering device (the loudspeaker 210c), occurring at instants $T_{n-1}$, $T_n$, $T_{n+1}$, $T_{n+2}$, $T_{n+3}$. Interrupt INT(n−1) starts the rendering of the (n−1)-th audio data chunk, interrupt INT(n) starts the rendering of the n-th audio data chunk, and so on.

Assuming for the sake of simplicity that the data chunk size equals the audio frame size, the generic one of the rendering multimedia software module instances 410a or 410b starts writing (event Ws(n)) the n-th audio frame to the respective mixer contribution buffer 430-1 and 430-2 at instant $T_{n-1}$, when the audio rendering procedure 435 receives the interrupt INT(n−1) for starting to play the (n−1)-th data chunk; the writing of the n-th audio frame to the mixer contribution buffer ends (event We(n)) before the arrival of the next interrupt INT(n), thus when this next interrupt arrives the new audio data chunk is ready to be played; when, at instant $T_n$, the audio rendering procedure 435 receives the next interrupt INT(n) for starting to play the (n)-th data chunk, the rendering multimedia software module instance 410a or 410b start writing (event Ws(n+1)) the (n+1)-th audio frame to the respective mixer contribution buffers 430-1 and 430-2; the writing of the (n+1)-th audio frame to the mixer contribution buffer ends (event We(n)) before the arrival of the next interrupt INT(n), so the new data chunk is ready to be played when the next interrupt INT(n+1) arrives, and so on.

Thanks to the fact that the mixing operation is performed on the fly in the audio rendering procedure 435, starting at the receipt of the interrupt (or of the asynchronous notification) from the rendering devices, additional buffering and delays are avoided.

Figure 7:
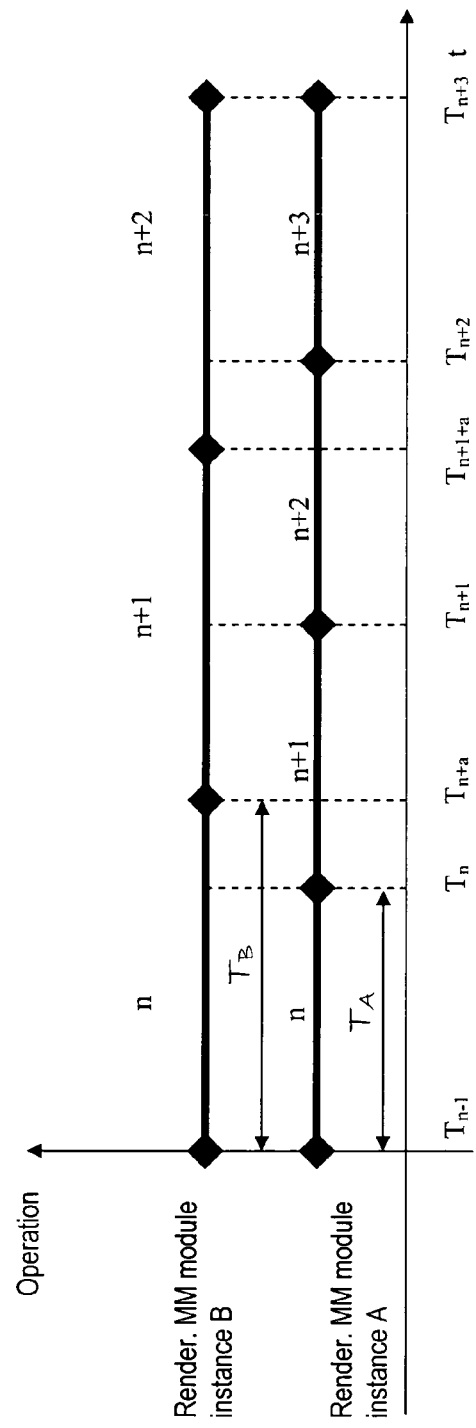
FIG. 7 is a time diagram of an exemplary case in which chunks of audio data streams arriving at the endpoint that hosts the audio conference mixer from two peers engaged in a virtual conference are made available to the audio conference mixer at different rates.

As mentioned in the foregoing, a possibility when the audio frames coming from/to be sent to the different peers are different in size, is to work with data chunks of size equal to the lowest common multiple of the sizes of the different audio frames. Referring to FIG. 7, in a time diagram similar to that of FIG. 6 there is depicted a case in which the two peers A and B adopt different audio frames; this translates into different periods $T_A$, $T_B$ at which the rendering multimedia software module instances 410a or 410b make the audio frames available. Supposing that, at the instant $T_{n-1}$ at which the rendering multimedia software module instance 410a starts making available the n-th frame of the audio stream coming from peer A, the rendering multimedia software module instance 410b also starts making available the n-th frame of the audio stream coming from the peer B. At instant $T_n$ the rendering multimedia software module instance 410a completes the n-th audio frame, and starts making available the (n+1) audio frame; the rendering multimedia software module instance 410b instead completes the n-th audio frame later, at instant $T_{n+a}$. Similarly, the rendering multimedia software module instance 410a completes the (n+1)-th audio frame at instant $T_{n+1}$, whereas the rendering multimedia software module instance 410b completes the (n+1)-th audio frame later, at instant $T_{n+1+a}$. The rendering multimedia software module instance 410a completes the (n+2)-th audio frame at instant $T_{n+2}$, whereas the rendering multimedia software module instance 410b completes the (n+2)-th audio frame later, at instant $T_{n+3}$, when the rendering multimedia software module instance 410a completes the (n+3)-th audio frame: at this instant, the two rendering multimedia software module instances 410a and 410b are again synchronized. In order to prevent underflow at the instant $T_{n+a}$, the mixer contribution buffers 430-1 and 430-2 may be designed so as to contain data chunks of size equal to four audio frames from peer A, and three audio frames from peer B.

Preferably, in order to keep the end-to-end delay as low as possible, the size of the data chunks used by the conference mixer 205 may be equal to maximum common divisor, instead of the lowest common multiple, of the audio frames adopted by the different peers. For example, assuming again that the audio frames from/to peer A are of 30 ms, and those from/to the peer B are of 20 ms, the conference mixer 205 may be designed to work with data chunks of 10 ms; this means that every 10 ms, an interrupt arrives from the loudspeaker 210c, and a new data chunk of 10 ms is generated (by mixing data chunks of 10 ms of the audio frames stored in the mixer contribution buffers 430-1 and 430-2) on-the-fly by the mixer 430 and sent to the loudspeaker 210c; every two interrupts, the rendering multimedia software module instance 410b is notified that in the buffer 430-2 there is space for a new audio frame, while this happens every three interrupts for the rendering multimedia software module instance 410a.

This allows to perform mixing operation with an integer number of data chunk "quanta" on every buffer (on the contrary, should the data chunk size used in mixing be different for the different peers, more data would have to be buffered in order to prevent artifacts due to buffer underflow).

An advantage of implementing the conference mixer 205 in such a way that it exposes the same APIs to the grabbing and rendering multimedia software module instances 405a, 405b, 410a and 410b as conventional rendering/grabbing libraries or kernel device drivers make it suitable to be "transparently" inserted in an already working equipment architecture, without impacting on the rendering and grabbing multimedia modules implementation.

In a preferred embodiment of the present invention, the usage of the conference mixer 205 is selectable by the user on a per-connection basis: during a communication involving just two peers, like for example peers A and C, or peers B and C, no mixing is needed, while the mixing becomes necessary during a multi-peer (three or more) session.

Restricting the usage of the conference mixer 205 to those cases wherein mixing is really necessary allows reducing side effects, like increasing the end-to-end delay during a conversation between just two peers.

In particular, the conference mixer 205 may be adapted to "auto enabling" when a third peer of a virtual conference starts producing an requesting audio data chunks.

In principle, as long as only two peers are engaged in a communication, the conference mixer could be not used, thus avoiding introducing additional end-to-end delay, and when a third peer enters the communication session, the mixer could be inserted. However, this live, on-the-fly insertion of the conference mixer is a time consuming operation that might cause long artifacts. In a preferred embodiment of the invention, in order to both avoid adding end-to-end delay when the mixing operation is not needed, and at the same time avoid the artifacts caused by the delay of insertion of the mixer when the third peer enter the conference, the conference mixer 205 is already used since the beginning of the communication between the first two peers, and the buffering is reduced to the minimum required by the number of peers actively engaged in the conference. By "actively engaged" it is meant having "open" rendering/grabbing devices. The engagement of the mixer does not rely on the data flow (to or from its data interfaces) but on the explicit intention of a multimedia software module (grabbing or rendering) to start a new session; data flow in fact can be discontinuous as it is related to data availability for the remote peer. In particular, when only two peers, e.g. peers A and C are active, no mixing operations are needed and the conference mixer 205 prevents buffering of audio data chunks in the data contribution buffer 420-1 and in the mixer contribution buffer 430-1. Data chunks are directly written by the rendering multimedia software module instance 410a to the output device 210c, without any buffering. In this way, no extra delay is introduced. In this condition, the thread 435 that, when the mixer is enabled, working synchronously with the interrupts received from the output rendering device 210c, takes the data chunks from the mixer contribution buffers 430-1 and 430-2, when the mixer is disabled does not perform any mixing, but it is only responsible for signaling to the rendering multimedia software module instance 410a that the device is ready for rendering. A similar behavior is performed by the grabbing thread. When a new peer, like peer B, becomes active, the mixing operation, and the relevant buffering operations are re-enabled.

The rendering and grabbing multimedia software modules do not need to change behavior when the conference-mixer is enabled. This reduces the complexity of the software itself, especially in a crucial part as the low latency handling of audio.

The present invention has been here described considering some exemplary embodiments. Those skilled in the art will readily appreciate that several modifications to the described embodiments are possible, as well as different embodiments, without departing from the scope of protection defined in the appended claims.

In particular, although in the above description reference has been made to an audio conference, the present invention can also be applied to audio/video virtual conferences, by adding the buffers and mixers for the video component in an analogous manner as that described in the foregoing.

The invention claimed is:

1. A telecommunications terminal hosting a conference mixer capable of being adapted to enable an at least audio conference between a first conference peer and at least two further conference peers, the conference mixer comprising:

for each of the at least two further conference peers, a respective first data buffer capable of being configured to buffer portions of at least an audio data stream received from a respective conference peer;

a first audio data stream portions mixer fed by the first data buffers and capable of being configured to:

a) get audio data stream portions buffered in the first data buffers;

b) mix the audio data stream portions from the first data buffers to produce a first mixed audio data portion; and c) feed the first mixed audio data portion to a rendering device of the telecommunications terminal, wherein said first audio data stream portions mixer is capable of being configured to perform operations a), b) and c) upon receipt of a notification from said rendering device indicating that the rendering device is ready to render a new mixed audio data portion.

2. The telecommunications terminal of claim 1, wherein said rendering device comprises a loudspeaker.

3. The telecommunications terminal of claim 1, wherein each of said first data buffers comprises at least two storage areas each one capable of being adapted to store at least one fragment of the audio data stream received from the respective peer.

4. The telecommunications terminal of claim 3, wherein each of said first data buffers is capable of being configured to be fed by a respective rendering function, said rendering function capable of being adapted to receive the audio data stream from the respective conference peer, and to provide to the respective first data buffer fragments of predetermined size of the audio data streams.

5. The telecommunications terminal of claim 4, wherein each of said storage areas has a size equal to a maximum common divisor of the sizes of the fragments of the audio data streams generated by the rendering functions of the at least two further peers.

6. The telecommunications terminal of claim 4, wherein each of said storage areas has a size equal to a lowest common multiple of the sizes of the fragments of the audio data streams generated by the rendering functions of the at least two further peers.

7. The telecommunications terminal of claim 4, further comprising a first application program interface for enabling access thereto by rendering functions.

8. The telecommunications terminal of claim 7, wherein said conference mixer is capable of being configured to be implemented as a user-space process running in a user space of the telecommunications terminal.

9. The telecommunications terminal of claim 7, wherein said conference mixer is capable of being configured to be implemented as a kernel-space process running in a kernel space of the telecommunications terminal.

10. The telecommunications terminal of claim 1, further comprising:

for each of the at least two further conference peers, a respective second data buffer capable of being configured to buffer the portions of at least an audio data stream received from the other conference peer;

a second audio data stream portions mixer fed by the second data buffers and configured to:
- d) get audio data stream portions buffered in the second data buffers;
- e) get audio data stream portions from a capturing device of the telecommunications terminal; and
- f) mix the audio data stream portions from the second data buffers and the audio data stream portions from the capturing device to produce a respective second mixed audio data portion to be sent to a respective one of said at least two further conference peers, wherein said second audio data stream portions mixer is configured to perform operations d), e) and f) upon receipt of a notification from said capturing device indicating that the capturing device has captured a new audio data stream portion.

11. The telecommunications terminal of claim 10, further comprising:
for each of the at least two further conference peers, a respective third data buffer capable of being configured to buffer the second mixed audio data portions produced by the respective second audio data stream portions mixer.

12. The telecommunications terminal of claim 11, wherein each of said third data buffers is capable of being configured to feed a respective grabbing function, said grabbing function capable of being adapted to transmit the audio data stream to the respective conference peer.

13. The telecommunications terminal of claim 12, further comprising a second application program interface for enabling access thereto by said grabbing function.

14. The telecommunications terminal of claim 1, wherein said conference mixer is capable of being further configured to:
- detect the presence of said at least two further conference peers;
- automatically enable the first audio data stream portions mixer upon detection of said at least two further peers; and
- automatically disable said first audio data stream portions mixer in case the presence of just one further peer is detected.

15. The telecommunications terminal of claim 14, wherein said conference mixer is capable of being further configured to automatically enable the second audio data stream portions mixers upon detection of the presence of said at least two further peers, and to automatically disable the second audio data stream portions mixers in case the presence of just one further peer is detected.

16. A method of performing an at least audio conference between a first conference peer and at least two further conference peers, comprising:
at a telecommunications terminal of the first conference peer, performing a first buffering of portions of at least an audio data stream received from each of the at least two further conference peers; and upon receipt of a notification from a rendering device of the telecommunications terminal, indicating that the rendering device is ready to render a new mixed audio data portion:
- mixing the audio data stream portions buffered in said first buffering, to produce the mixed audio data portion; and
- feeding the mixed audio data portion to the rendering device.

17. The method of claim 16, wherein said rendering device comprises a loudspeaker.

18. The method of claim 16, wherein said performing a first buffering comprises storing at least one portion of the audio data stream received from a respective peer.

19. The method of claim 18, comprising receiving said at least one portion of the audio data stream to be stored from a respective rendering function capable of being adapted to receive the audio data stream from the respective conference peer.

20. The method of claim 19, wherein said at least one portion has a size equal to a maximum common divisor of the sizes of audio data stream fragments generated by the rendering functions of the at least two further peers.

21. The method of claim 19, wherein said at least one portion has a size equal to a lowest common multiple of the sizes of audio data stream fragments generated by the rendering functions of the at least two further peers.

22. The method of claim 16, further comprising:
performing a second buffering, for each of the at least two further conference peers, of the portions of at least an audio data stream received from the other conference peer; and
upon receipt of a notification from a capturing device of the telecommunications terminal indicating that the capturing device has captured a new audio data stream portion:
- mixing the data stream portions buffered in said second buffering with an audio data stream portion captured by the capturing device to produce a respective second mixed audio data portion to be sent to a respective one of said at least two further conference peers.

23. The method of claim 22, further comprising:
performing, for each of the at least two further conference peers, a third buffering of the second mixed audio data portions.

24. The method of claim 23, further comprising:
feeding the buffered second mixed audio data portions to a respective grabbing function capable of being adapted to transmit the audio data stream to the respective conference peer.

25. The method of claim 16, further comprising:
detecting the presence of said at least two further conference peers;
automatically enabling said first buffering and mixing upon detection of said at least two further peers; and
automatically disabling said first buffering and mixing in case the presence of just one further peer is detected.

* * * * *